United States Patent [19]

Tomoda

[11] Patent Number: 5,126,955
[45] Date of Patent: Jun. 30, 1992

[54] MANUALLY SWEEPABLE APPARATUS HOUSED IN A COMPUTER MAIN BODY

[75] Inventor: Takao Tomoda, Tokyo, Japan

[73] Assignee: Kabushiki Kaisha Toshiba, Kawasaki, Japan

[21] Appl. No.: 478,080

[22] Filed: Feb. 9, 1990

[30] Foreign Application Priority Data

Feb. 10, 1989 [JP] Japan .................................. 1-31338

[51] Int. Cl.⁵ .......................... G06F 1/00; G09G 3/02
[52] U.S. Cl. .................................... 364/708; 340/710
[58] Field of Search ............ 364/708, 709.01, 709.11, 364/709.12, 704; 340/706, 709, 710, 711; 384/419

[56] References Cited

U.S. PATENT DOCUMENTS

| | | | |
|---|---|---|---|
| 4,181,966 | 1/1980 | Wenninger et al. | 364/715 |
| 4,654,818 | 3/1987 | Wetterau, Jr. | 364/704 |
| 4,715,385 | 12/1987 | Cudahy et al. | 364/708 |
| 4,804,949 | 2/1989 | Faulkerson | 340/709 |
| 4,914,711 | 4/1990 | Rubinstein | 384/419 |
| 4,941,841 | 7/1990 | Darden et al. | 364/708 |

FOREIGN PATENT DOCUMENTS

| | | |
|---|---|---|
| 63276109 | 2/1986 | Japan . |
| 63-188740 | 11/1988 | Japan . |
| 6119829 | 12/1988 | Japan . |

*Primary Examiner*—Long T. Nguyen

[57] ABSTRACT

A manually sweepable apparatus for a portable computer includes a housing adapted to be mounted in a computer main body, a mouse mechanism contained in the housing, and a mechanism for electrically connecting the mouse mechanism to the computer main body. The manually sweepable apparatus has a mechanism for mounting the housing on the computer main body in such a state that the housing is exposed at the substantially horizontal and vertical faces of the computer main body without projecting from the horizontal and vertical faces.

10 Claims, 4 Drawing Sheets

MANUALLY SWEEPABLE APPARATUS HOUSED IN A COMPUTER MAIN BODY

BACKGROUND OF THE INVENTION

1. Field of the Invention

This invention relates to a manually sweepable apparatus housed in a computer main body when it is not in use and taken out therefrom when it is used.

2. Description of the Related Art

There have been recently developed many kinds of small and efficient computers such as lap-top type computers. Some of these computers can be connected by means of pointing devices, each of which is usually called a "mouse". Specific commands can be selected from the executable commands in the menu by connecting the mouse to the computer so as to use the computer conveniently. Further, the mouse is useful to draw a figure on the screen of the display device of the computer. Thus, the use of the mouse allows the small portable computer to function fully.

Generally, the mouse is a separate device from the computer main body. When required to be frequently used with the portable computer, the mouse must be carried together with the computer so that it can be connected to the computer body upon using the computer. However, it is not only inconvenient to carry the computer together with the separate mouse but also it is cumbersome to connect the mouse to and disconnect the same from the computer.

The computer is also connected by means of those peripheral units such as an image reader for directly inputting image signals to the computer and a printer which are also frequently used as the mouse. It is desired, therefore, that the peripheral units be easily carried together with the portable computer and be readily connected to and disconnected from the computer main body.

SUMMARY OF THE INVENTION

This invention was made to solve the problems which the conventional computers encounter and the object thereof is to provide a manually sweepable apparatus which can be housed in a portable computer body.

In order to attain the object, this invention provides a manually sweepable apparatus for a portable computer comprising a housing mounted in a computer main body, a mouse mechanism contained in the housing, means for always electrically connecting the mouse mechanism to the computer main body, and means for connecting the upper portion of the housing to the computer main body so that the housing is exposed at the substantially horizontal and vertical faces of the computer main body but is not extended from the substantially vertical and horizontal faces of the computer main body.

The whole manually sweepable apparatus is housed in the portable computer main body and is always electrically connected to the computer body by means of the connecting means, allowing the computer to be handy to carry. In addition, since the manually sweepable apparatus is exposed at the substantially horizontal and vertical faces of the computer main body, it is easily mounted in and taken out of the computer main body, enabling the computer to fully function.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
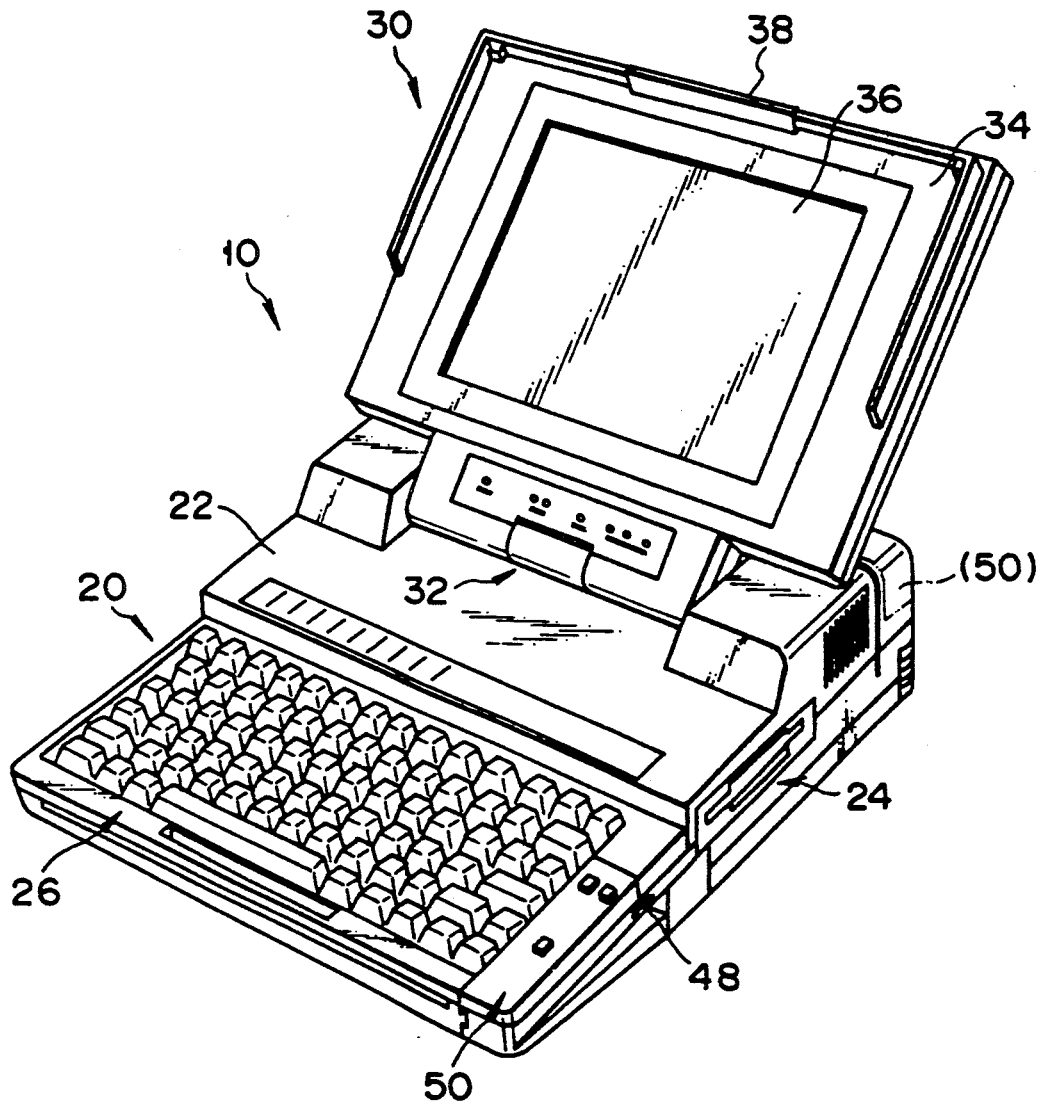
FIG. 1 is a schematic perspective view of a lap-top type computer housing one embodiment of the manually sweepable apparatus of this invention.

As shown in FIG. 1, a personal computer 10 of lap-top type embodying this invention comprises a main body 20 and a display unit 30 pivotally connected thereto by means of a hinge mechanism 32. A conventional display unit 30 has a frame structure 34 fixed to a part of the hinge mechanism 32 and has a liquid crystal display panel 36 (with or without a backlight) supported by the frame structure 34. When overlapped on the main body 20, the display unit 30 is locked to the main body 20 by means of a stop piece 38.

The main body 20 has a rigid casing 22 containing many electronic circuit units, a floppy disk driving unit 24 and a keyboard 26. The driving unit 24 and the keyboard 26 may be conventional, the detailed description thereof being omitted.

The main body 20 is provided with a compact manually sweepable apparatus 50 having a substantially rectangular-parallelepiped shape. The manually sweepable apparatus 50 is located at the position adjacent to the keyboard 26 as enclosed by the solid lines in FIG. 1, at the position opposite to the keyboard 26 as shown by the phantom lines or other similar positions so as not to hinder the operation of the computer. When located at the position indicated by the phantom line, the manually sweepable apparatus is designated by (50). At either position, the manually sweepable apparatus is housed in the main body 20 and can be connected thereto. The explanation will be made when the manually sweepable apparatus 50 is placed at the position adjacent to the keyboard 26.

Figure 2:
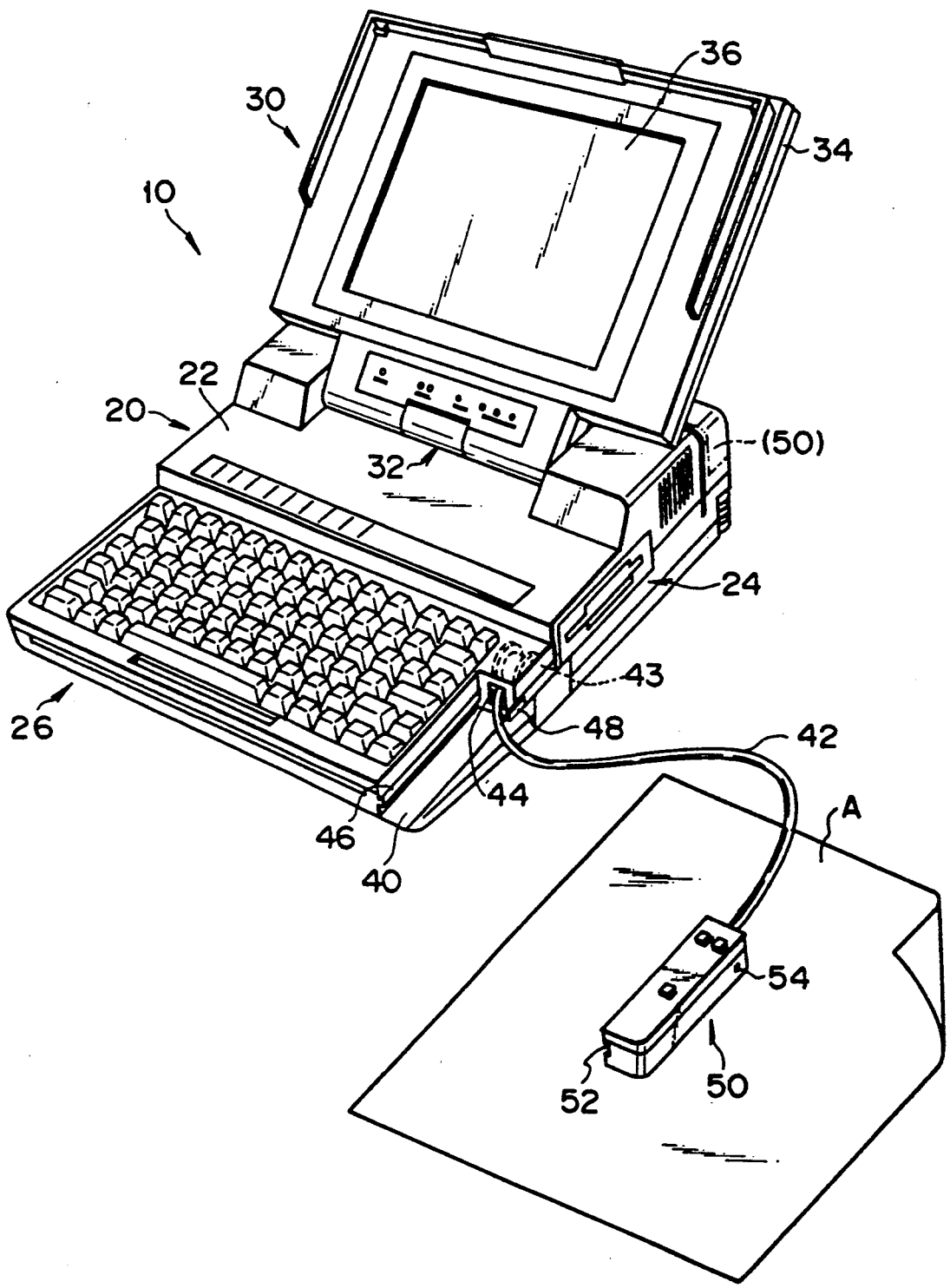
FIG. 2 is a schematic perspective view of the computer of FIG. 1 when the manually sweepable apparatus is being used.

As seen in FIG. 2, the manually sweepable apparatus 50 is connected to the main body 20 via a cable 42 to interchange data signals between the manually sweepable apparatus 50 and the main body 20.

The main body 20 has a depressed portion 40 for holding the manually sweepable apparatus 50 and an opening 44 through which the cable 42 extends. The depressed portion 40 has a shape complementary to the substantially rectangular-parallelepiped manually sweepable apparatus 50 such that the manually sweepable apparatus 50 is placed in the depressed portion 40 without obstructing the operation of the computer 10. The main body 20 further has a reel 43 for taking up the cable 42 in the main body 20, holding means 46 for holding the manually sweepable apparatus 50 in the main body 20 and an engaging member 48 for causing the manually sweepable apparatus 50 to engage the main body 50. It is preferred that the reel 43 take the cable 42 up automatically without twisting the same. Various automatic take-up reels are known, the description thereof being omitted.

As shown in FIG. 2, the holding means 46 for holding the manually sweepable apparatus 50 in the main body 20 comprises a trapezoidal guide rail. In a lateral side of the manually sweepable apparatus 50 a guide groove 52 is formed having a cross section complementary to that of the guide rail 46 such that the guide groove 52 mates with the guide rail 46. The manually sweepable apparatus 50 is placed at the predetermined position by sliding the manually sweepable apparatus 50 along the guide rail 46 with the guide groove 52 engaged with the guide rail 46. It is preferred that the manually sweepable apparatus 50 be provided with a suitable depression 54 which receives the engaging member 48 when the manually sweepable apparatus 50 is positioned at the above predetermined position.

The manually sweepable apparatus 50 is prevented by the guide rail 46 and the guide groove 52 from being moved in the crosswise directions with respect to the longitudinal directions of the guide rail and the guide groove and is also hindered by the engaging member 48 and the depression 54 from being displaced in the longitudinal directions of the guide rail 46. The depressed portion 40 of main body 20 has the dimensions corresponding to those of the manually sweepable apparatus 50 such that the manually sweepable apparatus 50 is exposed at the upper face of the main body 20 but does not project therefrom when the manually sweepable apparatus 50 is placed in position in the depression portion 40, whereby the manually sweepable apparatus 50 does not obstruct the operation of the computer 10.

Upon using the manually sweepable apparatus 50, the engaging member 48 is disengaged from the depression 54 and the manually sweepable apparatus 50 is caused to slide along the guide rail 46. The cable 42 is pulled out from the reel 43 by a required length such that the manually sweepable apparatus 50 can be operated on a required sheet A.

Figure 3:
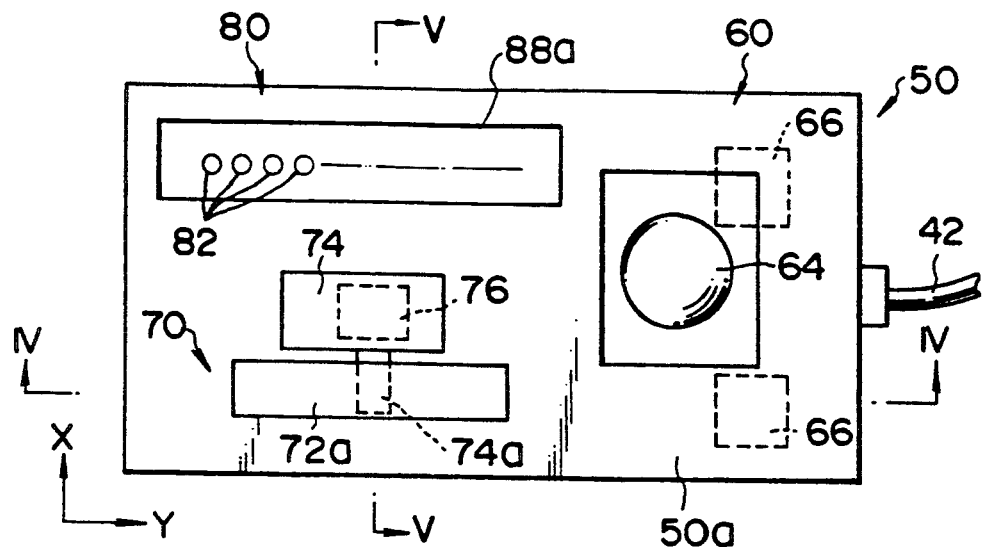
FIG. 3 is a schematic bottom view of the manually sweepable apparatus of FIG. 1.
Figure 4:
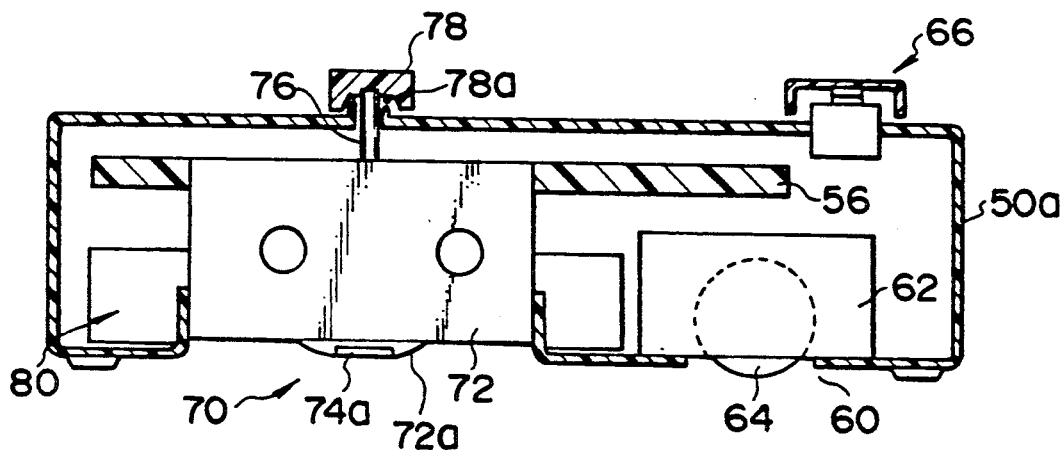
FIG. 4 is a schematic cross-sectional view along the line IV—IV of FIG. 3.

The manually sweepable apparatus 50 will be explained with reference to FIGS. 3 to 5.

The manually sweepable apparatus 50 has a housing 50a which is sized for an operator to easily grip with the hand. The housing 50a contains a control substrate 56 and mouse mechanism 60 for indicating the position of the manually sweepable apparatus 50 in the orthogonal coordinate system (X-Y). Like a conventional unit, the mouse mechanism 60 has a track ball 64 rotated by the friction produced between the track ball 64 and the sheet A when the mouse mechanism 60 moves on the sheet A (FIG. 2), a detecting mechanism 62 holding the track ball 64 for detecting the rotational direction and the amount of the rotation of the track ball 64, and two mouse buttons 66.

In the housing 50a of the manually sweepable apparatus 50 ar mounted a printing unit 70 and an image reader 80 for reading the images and supplying the image signals directly to the computer 10.

The printing unit 70 comprises a ribbon cassette 72 including an ink ribbon 72a and a printing head supporting body 74. The printing head supporting body 74 has a thermal head 74a inserted between the ribbon cassette 72 and the ink ribbon 72a drawn out from the ribbon cassette 72, and is connected by means of a push rod 76 and a spring 77 to an operation button 78 externally mounted on the housing 50a. The operation button 78 is urged by means of a spring 78a such that the operation button 78 is separated from the housing 50a. Upon the depression of the operation button 78, the printing head supporting body 74 is moved against the biasing force of the springs 78a and 77 to cause the thermal head 74a as well as the ink ribbon 72a to slightly project from the housing 50a. As the manually sweepable apparatus 50 is moved in the Y direction in FIG. 3, the ink of the ink ribbon 72a melted by the thermal head 74a is transferred to the required portion to be printed.

Figure 5:
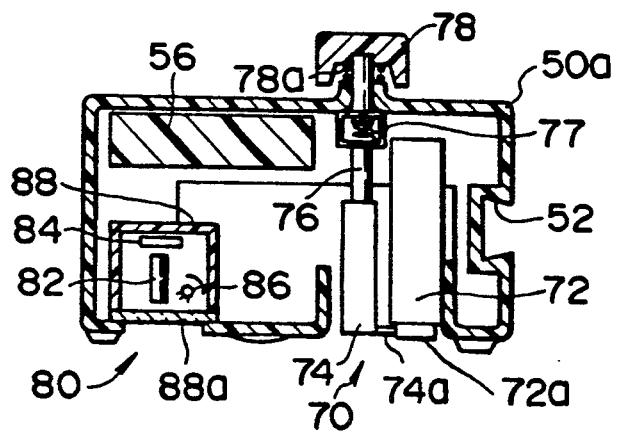
FIG. 5 is a schematic cross-sectional view along the line V—V of FIG. 3.

As shown in FIG. 5, an image reader 80 comprises a plurality of lenses 82 arranged in a row, a lot of CCDs 84 for detecting the images formed by the lenses 82 and an illuminating lamp 86. These members form a unit and are housed in a casing 88 having a glass plate 88a. As the manually sweepable apparatus 50 is moved in the X direction, the light beams emitted from the illuminating lamp 86 are reflected on the glass plate 88a and focused by the lenses 82 to be converted into electrical signals by means of the CCDs 84. As a result, the required image can be directly supplied to the computer 10.

Figure 6:
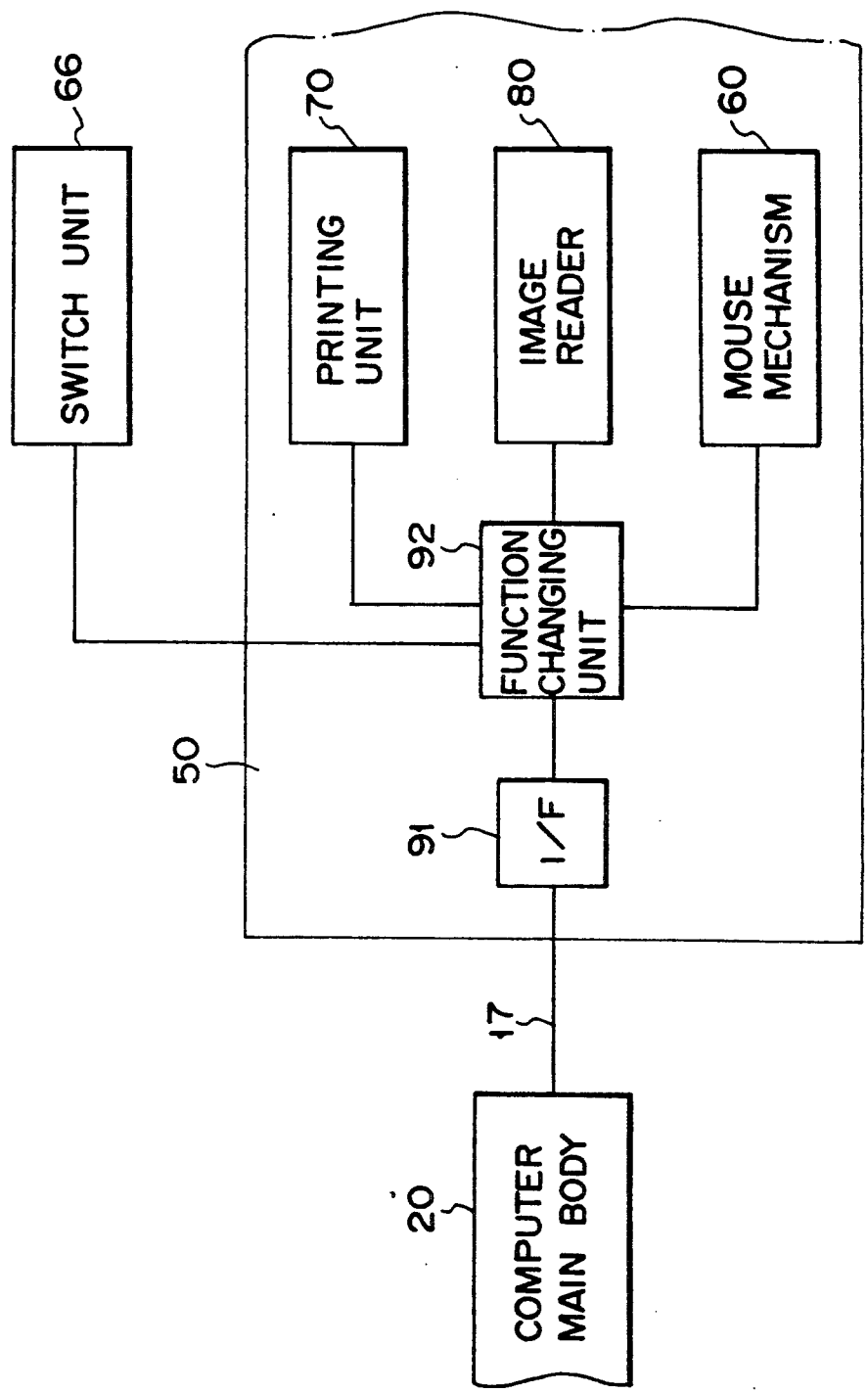
FIG. 6 is a block diagram of the manually sweepable apparatus.

As shown in FIG. 6, the computer main body 20 is connected to an interface unit 91 by means of the cable 42. The interface unit 91 controls the inputs and the outputs of the data between the computer main body 20 and the manually sweepable apparatus 50. Namely, the interface unit 91 supplies the change control signals or the printing data from the computer main body 20 to a function changing unit 92 and also supplies such data for the moving directions and/or the amounts of movements received by the function changing unit 92 to the computer main body 20.

The function changing unit 92 changes the operations of the printing unit 70, the image reader 80 and the mouse mechanism 60 in accordance with the change control signals from the computer main body 20. Further, the function changing unit 92 supplies the printing data to the printing unit 70 and transmits, via the interface 91 to the computer main body 20, the image data read by the image reader 80 and the moving data detected by the mouse mechanism 60. The function changing unit 92 is not only controlled by the signals from the computer main body 20 as described above, but also may be regulated by a switch 66 provided on the manually sweepable apparatus 50 as shown in FIG. 6.

Since the manually sweepable apparatus 50 has the mouse mechanism 60, the printing unit 70 and the image reader 80 contained in the housing 50a, the images read by the image reader 80 are not. Nor distorted is the printing by the printing unit 70 distorted because the amount of the movement of the manually sweepable apparatus 50 is detected by the number of rotations of the track ball 64 and thereby the printing is controlled by means of the computer main body 20 through the cable 42. The image reader 80 is similarly controlled to allow the computer main body 20 to read the required images correctly.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer comprising:
   a base unit including a keyboard portion, a mounting portion, a first upper surface and a first side wall;
   a removable unit removably mounted on the mounting portion, the removable unit having a second upper surface, a second side wall, a printer and a pointing device, the second upper surface being substantially flush with the first upper surface and the second side wall being substantially flush with the first side wall when the removable unit is mounted on the mounting portion; and
   connecting means for electrically connecting to the removable unit and the base unit, the removable unit being controlled by the base unit through the connecting means.

2. A computer according to claim 1, wherein the removable unit further comprises an image reader controlled by the base unit through the connecting means.

3. A computer according to claim 2, wherein the removable unit further comprises a selector for selecting one of operations of the printer, the pointing device and the image reader.

4. A computer according to claim 1, wherein the keyboard portion further comprises a side edge including the mounting portion.

5. A computer according to claim 4, wherein the keyboard portion comprises the first upper surface and the first side wall.

6. A computer according to claim 4 further comprising a display unit rotatably connecting to the base unit, the display unit being rotatable between a close position for covering the keyboard portion and the mounting portion and an open position for exposing the keyboard portion and the mounting portion.

7. A computer according to claim 1, wherein the base unit further comprises a rear portion including the mounting portion.

8. A computer according to claim 7, wherein the rear portion comprises the first upper surface and the first side wall.

9. A computer according to claim 1, wherein the printer further comprises a thermal head, an ink ribbon cassette and a button for slightly projecting the thermal head from the removable unit.

10. A computer according to claim 1, wherein the connecting means further comprises a cable and an automatic takeup reel mounted in the base unit.

* * * * *